United States Patent [19]

Hakoyama et al.

[11] Patent Number: 4,672,391

[45] Date of Patent: Jun. 9, 1987

[54] THERMAL HEAD

[75] Inventors: Akiyoshi Hakoyama; Shouji Saitoh; Akira Sasaki, all of Hitachi, Japan

[73] Assignee: Hitachi, Ltd., Tokyo, Japan

[21] Appl. No.: 723,220

[22] Filed: Apr. 15, 1985

[30] Foreign Application Priority Data

Apr. 16, 1984 [JP] Japan .................................. 59-75058

[51] Int. Cl.[4] .............................................. G01D 15/10

[52] U.S. Cl. .......................... 346/76 PH; 346/139 C; 400/120

[58] Field of Search .............. 346/76 PH, 139 L, 155; 400/120, 121, 199, 124–125.1; 219/216 PH, 543; 338/308, 309; 250/318

[56] References Cited

U.S. PATENT DOCUMENTS

| | | | |
|---|---|---|---|
| 3,631,512 | 3/1970 | Janning | 219/216 PH |
| 3,684,858 | 8/1972 | Buck | 219/543 |
| 4,048,470 | 9/1977 | Shindo et al. | 219/543 |
| 4,130,752 | 12/1978 | Conta et al. | 346/76 PH |
| 4,327,365 | 4/1982 | Noda | 346/76 PH |

FOREIGN PATENT DOCUMENTS

| | | | |
|---|---|---|---|
| 0212970 | 12/1983 | Japan | 400/120 |

*Primary Examiner*—Arthur G. Evans

*Attorney, Agent, or Firm*—Antonelli, Terry & Wands

[57] ABSTRACT

A thermal head for use in a dot-matrix printer is disclosed in which a plurality of heating elements for printing dots on recording paper are arranged in a line oblique with respect the moving direction of the thermal head, the dimension of the heating surface of each heating element in a direction parallel to the moving direction of the thermal head is made smaller than the dimension of the heating surface in a direction perpendicular to the above moving direction, each of wiring conductor pairs for supplying a current to the heating elements is extended from both ends of the heating surface in the lengthwise direction thereof, in a direction perpendicular to the moving direction of the thermal head, one wiring conductor of each wiring conductor pair is connected to a common wiring conductor, and the other wiring conductor of each wiring conductor pair is connected directly to a drive circuit.

7 Claims, 9 Drawing Figures

THERMAL HEAD

BACKGROUND OF THE INVENTION

The present invention relates to a thermal head, and more particularly to a thermal head suitable for use in a printer for recording a high-density image such as a dot-matrix Chinese character printer.

In a dot-matrix Chinese character printer utilizing thermal recording techniques, a thermal head in which a plurality of heating elements and wiring conductors connected thereto are arranged on a substrate, is pressed against a thermal recording medium to heat the recording medium by the heating elements which are supplied with electric power from a drive circuit through the wiring conductors, and is moved in a direction intersecting with a direction, along which the heating elements are juxtaposed.

FIG. 1 shows the arrangement of heating elements and wiring conductors in a typical thermal head of the above kind, and the forms of the heating elements and wiring conductors. Referring to FIG. 1, heating elements 1*a* to 1*g* are disposed along a B-direction (hereinafter referred to as "vertical direction") perpendicular to an A-direction (hereinafter referred to as "horizontal direction") which is parallel to the moving direction of the thermal head. In the thermal head of FIG. 1, 24 heating elements are provided along a vertical direction so that relations $W \geqq P$ and $H < P$ are satisfied and P is about 140 μm, where W and P indicate the dimensions of each heating element in horizontal and vertical directions, respectively, and P indicates an interval at which the heating elements are arranged in the vertical direction. Wiring conductors 2*a* to 2*g* and 3*a* to 3*g* for supplying electric power to the heating elements 1*a* to 1*g* are extended therefrom in horizontal directions. End portions of the conductors 2*a* to 2*g* are connected to a common electrode 2*h*, which is connected to a drive circuit (not shown) disposed in a lower part of the thermal head. While, the conductors 3*a* to 3*g* extended from the heating elements 1*a* to 1*g* in horizontal directions are bent so as to be extended in vertical directions, and then connected to the drive circuit.

In such a thermal head, it is desirable that one dot recorded by one of the heating elements 1*a* to 1*g* has the form of a square. That is, it is desirable that the dimension w of one dot in a horizontal direction and the dimension h of the same dot in a vertical direction are both equal to a value d. Further, it is desirable that a vertical line formed by combining a plurality of dots each having the above dimensions has a width equal to the value d and a horizontal line formed by the combination of such dots has a width equal to the value d. Furthermore, it is desirable to form such lines in a very short time by moving the thermal head in a horizontal direction at high speed. Moreover, it is desirable to be able to record dots or lines satisfying a relation $w = h = P$, at high speed.

However, when the thermal head of FIG. 1 is moved in the horizontal direction to perform a recording operation, the heating elements kept at an elevated temperature heat a thermal recording medium while sliding thereon. Accordingly, the dimension w of a recorded dot in a horizontal direction becomes larger than the dimension W of each heating element in the horizontal direction (for instance, the dimension w is about 200 μm). The dimension w can be reduced by shortening a time during which the heating element is kept at a high temperature enough to perform a recording operation for the thermal recording medium. However, owing to the heating and cooling characteristics of each heating element, it is impossible to make the dimension w equal to the dimension W. The dimension w of a recorded dot in a horizontal dimension can be made small by reducing the dimension W of each heating element in a horizontal direction. In this case, however, the electric resistance of each heating element is reduced. Accordingly, in order to elevate the temperature of each heating element in a short time, it is required to supply a large current to each heating element, and thus power loss in the wiring conductors and drive circuit becomes large. The resistance of each heating element can be increased by making large the resistivity or thickness thereof. In order to make large the resistivity of the heating element, it is required to make the heating elements of limited kinds of materials. Further, when the thickness of the heating element is increased, characteristics of the heating element vary widely, on the basis of manufacturing errors. Accordingly, when the heating elements are made of a resistance material now available, and are formed so as to make the above-mentioned power loss as small as possible, the dimension W of each heating element in a horizontal direction is larger than the dimension H thereof in a vertical direction, and is not smaller than the interval P (that is, $W > H$ and $W \geqq P$).

While, in order to electrically insulate adjacent heating elements from each other, it is required to provide a gap (equal to, for instance, 15 μm) between adjacent heating elements. Thus, the dimension H is smaller than the internal P. In high-speed recording, it is very difficult to heat that region on the thermal recording medium which is ajacent, in a vertical direction, to an area pressed by the heating element, through heat conduction. Accordingly, the dimension h of a recorded dot in a vertical direction will be indicated by a relation $h \div H < P$.

Further, in order to make large the dimension h of a recorded dot in a vertical direction so that a continuous, vertical line can be formed of plural dots, it is required to pass a large current through each heating element, and therefore the dimension w of the recorded dot in a horizontal direction further increases.

As mentioned above, according to the conventional thermal head, a figure or character having a thick vertical line and a thin horizontal line is recorded. The width of the vertical line increases and the width of the horizontal line decreases, as the recording speed becomes higher.

In order to solve the problem resulting from the relation $H < P$, a thermal head shown in FIG. 2 has been proposed in which heating elements 4*a* to 4*g* are arranged in two columns so as to form a zigzag, thereby obtaining a relation $H > P$, and heating elements in a first column are made different in current flowing time from heating elements in a second column so that one continuous vertical line can be recorded by the heating elements in the first and second columns. Although the relation $H > P$ is achieved by the arrangement shown in FIG. 2, the problem with respect to a decrease in resistance of each heating element caused by reducing the dimension W cannot be solved by this arrangement, and therefore the relation $W > H$ remains as it is. Further, in the arrangement of FIG. 2, the heating elements in the first column and those in the second column are alternately supplied with a current so as to record dots at the same positions on recording paper, and thus a distance between the first and second columns is made equal to $(N+\frac{1}{2})P$, where N is a positive integer.

Further, a common wiring conductor 2$h'$ is disposed between the first and second columns, and wiring conductors 3$a'$ to 3$g'$ starting from heating elements 4$a$ to 4$g$ are first parallel to a horizontal direction and then bent downward to be connected to a drive circuit. Accordingly, the thermal head of FIG. 2 has a large width in a horizontal direction. Thus, a high pressure is required to sufficiently press the thermal head against the thermal recording medium. The use of such a high pressure will bring about other problems.

SUMMARY OF THE INVENTION

It is an object of the present invention to provide a thermal head which can record a dot or figure having a desired shape at high speed, without reducing the resistance of heating element.

In order to attain the above object, according to an aspect of the present invention, there is provided a thermal head which includes a plurality of heating elements each having a heating surface capable of satisfying a relation $W<H$ (where W indicates the dimension of each heating element in the moving direction of the thermal head, and H the dimension of each heating element in a direction intersecting with the moving direction of the thermal head).

Further, according to another aspect of the present invention, the heating elements are disposed along a direction oblique with respect to the moving direction of the thermal head, while making a distance P' between adjacent heating elements in the moving direction of the thermal head larger than the dimension W, wiring conductors from the heating elements are extended along a direction perpendicular to the moving direction of the thermal head, to be able to freely select the length of each wiring conductor, and the dimension W of each heating element in the moving direction of the thermal head is made small to increase the resistance of each heating element, thereby reducing an electric current supplied to each heating element.

DESCRIPTION OF THE PREFERRED EMBODIMENTS

Figure 3:
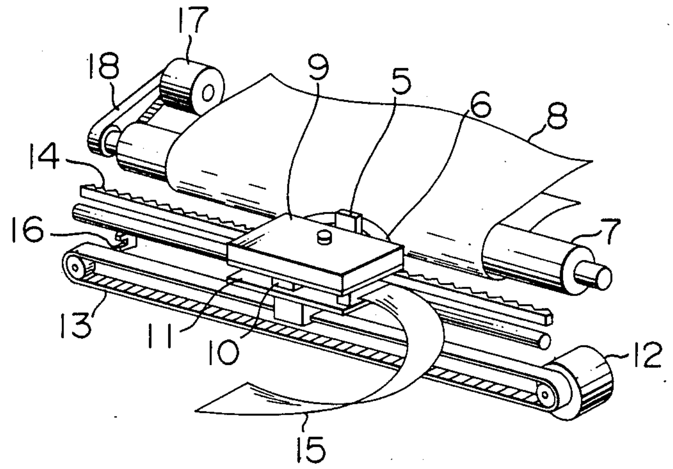
FIG. 3 is a perspective view showing the printing mechanism of a dot-matrix Chinese character printer of thermal transfer type which uses a thermal head according to the present invention.

FIG. 3 is a perspective view showing the printing mechanism of a dot-matrix Chinese character printer of thermal transfer type which uses a thermal head according to the present invention.

In FIG. 3, reference numeral 5 designates a thermal head, 6 an ink ribbon, 7 a platen roller, and 8 a sheet of recording paper. The recording paper 8 which is a recording medium, is wound around the platen roller 7, and the thermal head 5 presses the ink ribbon 6 against the recording paper 8, to heat and melt solid ink which is applied to the ink ribbon 6, by heating elements on the thermal head 5, and to attach the molten ink to the recording paper 8, thereby performing a recording operation. The ink ribbon 6 is previously stored in a ribbon cassette 9 in the form of a scroll, and a portion to be used is taken out of the ink cassette 9. After having been used, the above portion is wound around a reel mounted in the ink cassette 9. The thermal head 5, the ribbon cassette 9 and a traction solenoid 10 are mounted on a carriage 11, and the carriage 11 is moved along the platen roller 7 (that is, in a horizontal direction) by a timing belt 13 which is driven by a pulse motor 12. Another timing belt 14 which is not movable, is extended along the platen roller 7. When the carriage 11 is moved, a gear which is mounted in the carriage 11 and engages with the timing belt 14, is rotated, and thus produces a torque. The torque thus generated turns the reel in the ribbon cassette 9, to wind that portion of the ink ribbon 6 which has been used, around the reel, and to take out a new portion of the ink ribbon 6 from the ink cassette 9. The speed of movement of the ink ribbon 6 is made nearly equal to the speed of movement of the carriage 11, and therefore no friction is generated between the ink ribbon 6 and the recording paper 8.

The present printer (that is, the printer of FIG. 3) is of one-way printing type. That is, a recording operation is performed only when the carriage 11 is moved from left to right. Accordingly, an action for pressing the ink ribbon 6 against the recording paper 8 by the thermal head 5 and the movement of the ink ribbon 6 are performed only when the carriage 11 is moved from left to right, and are not performed when the carriage 11 is returned to the left side. The changeover of one of the above two states to the other state is carried out by selectively energizing the traction solenoid 10.

A flexible wiring board 15 is used for supplying recording data and electric power to the thermal head 5. A home position sensor 16 is used for detecting that the carriage 11 has been moved to a reference position. A pulse motor 17 rotates the platen roller 7 through a timing belt 18, to move the recording paper 8.

Figure 4:
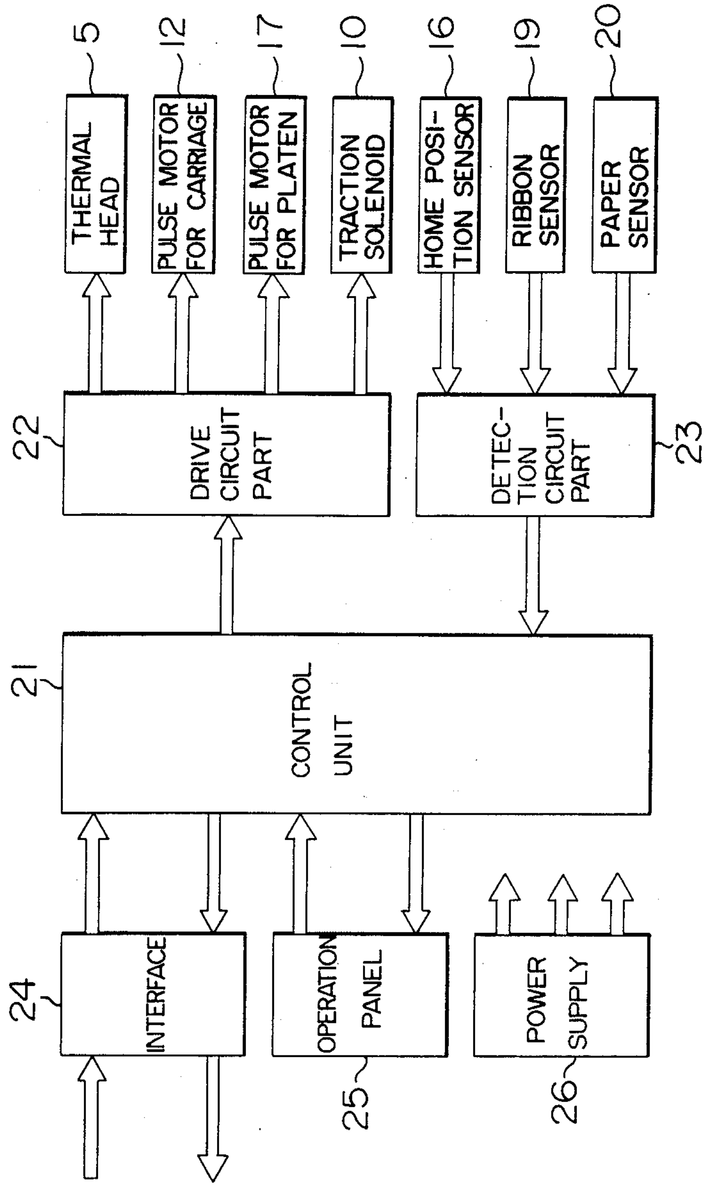
FIG. 4 is a block diagram showing the circuit configuration of the printer shown in FIG. 3.

FIG. 4 is a block diagram showing the circuit configuration of the present printer (namely, the printer shown in FIG. 3). In FIG. 4, reference numeral 5 designates the thermal head, 10 the traction solenoid, 12 the pulse motor for driving the carriage 11, 16 the home position sensor, 17 the pulse motor for driving the platen roller 7, 19 a ribbon sensor for detecting that the remainder of the ink ribbon 6 stored in the ribbon cassette 9 has been used, and 20 a paper sensor for detecting whether the recording paper 8 is present or not.

Referring to FIG. 4, a control unit 21 including a microprocessor controls the whole of the present printer, a drive circuit part 22 drives the thermal head 5, the pulse motors 12 and 17, and the traction solenoid 10, on the basis of a control signal from the control unit 21, and a detection circuit part 23 discriminates among analog signals from the sensors 16, 19 and 20, to convert these analog signals into digital signals, which are sent to the control unit 21. Further, in FIG. 4, reference numeral 24 designates an interface to an external data processor, 25 an operation panel, and 26 a power supply.

Figure 1:
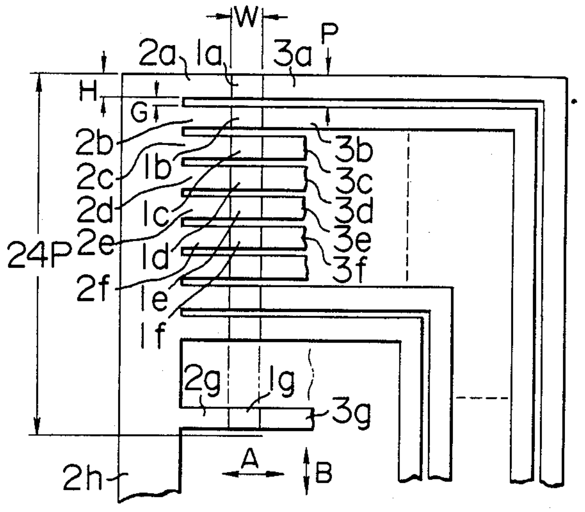
FIG. 1 PRIOR ART
FIGS. 1 and 2 are schematic diagrams showing the arrangement of heating elements and wiring conductors in two conventional thermal heads.
Figure 2:
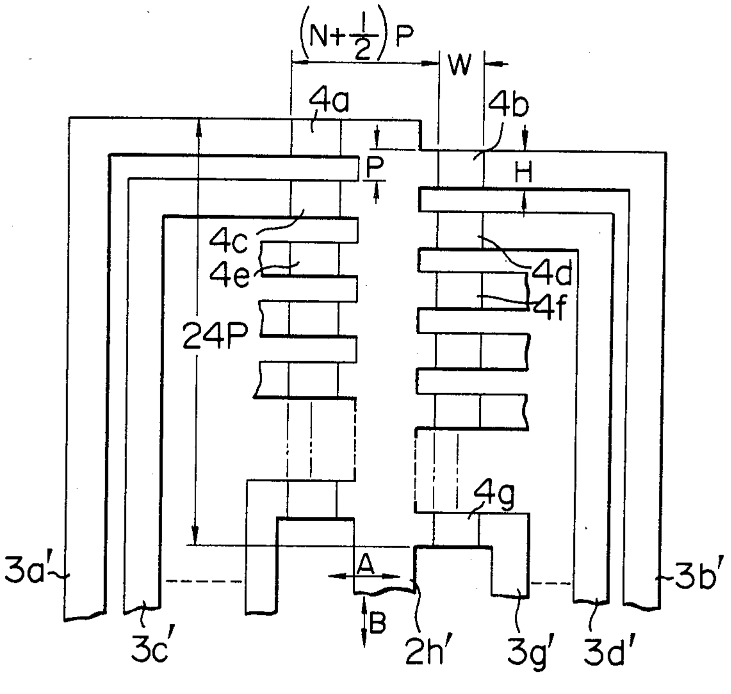
FIG. 2 PRIOR ART
Figure 5:
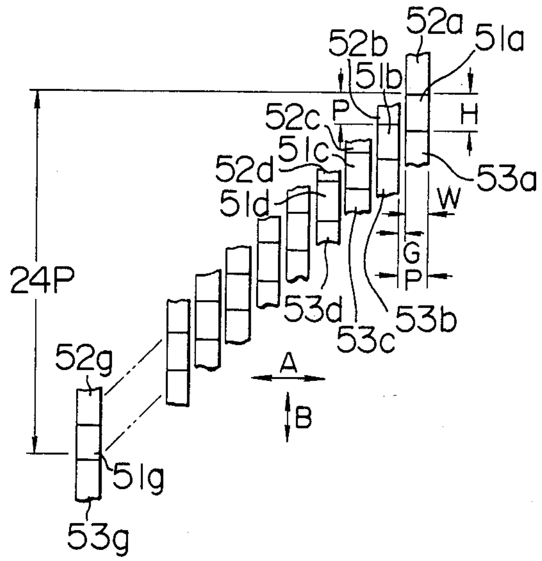
FIGS. 5 and 6 are schematic diagrams showing the arrangement of heating elements and wiring conductors in two embodiments of a thermal head according to the present invention, and showing the forms of the heating elements and wiring conductors.

FIG. 5 shows the arrangement of heating elements and wiring conductors in an embodiment of a thermal head according to the present invention, and respective forms of the above heating elements and wiring conductors. Referring to FIG. 5, each of heating elements 51*a* to 51*g* has a rectangular heating surface satisfying relations W<H and H>P, and the heating elements 51*a* to 51*g* are disposed along a line which is oblique with respect to a horizontal direction. Further, an interval P′, at which the heating elements are arranged when viewed along a horizontal direction, is made greater than the dimension W, to provide an insulating gap G between adjacent heating elements, and wiring conductors 52*a* to 52*g* and 53*a* to 53*g* are extended from the heating elements 51*a* to 51*g* along a vertical direction so as to form parallel lines. Incidentally, in FIGS. 5 to 7, an A-direction and a B-direction indicate a horizontal direction and a vertical direction, respectively, as in FIG. 1.

Figure 6:
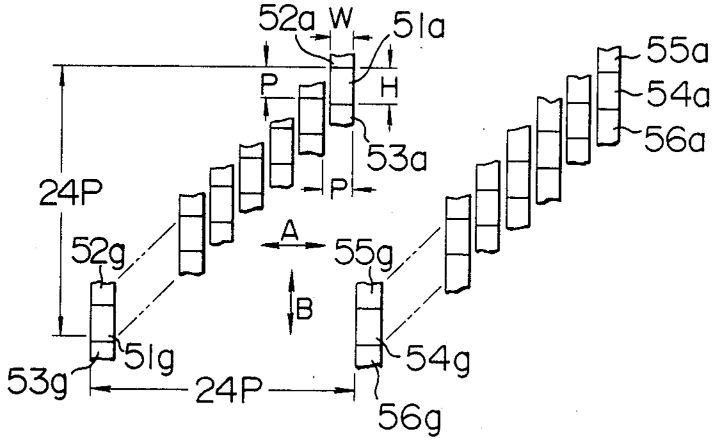

FIG. 6 shows another embodiment of a thermal head according to the present invention, in which in order to increase the recording speed, a second heating element group composed of heating elements 54*a* to 54*g* and a second wiring conductor group composed of wiring conductors 55*a* to 55*g* and 56*a* to 56*g* are further provided at positions spaced apart, by a distance of 24P′ along a horizontal direction, from a first heating element group composed of the heating elements 51*a* to 51*g* and a first wiring conductor group composed of the wiring conductors 52*a* to 52*g* and 53*a* to 53*g*.

The thermal head of the present printer, that is, the thermal head 5 shown in FIGS. 3 and 4 has the heating elements 51*a* to 51*g* and 54*a* to 54*g* and the wiring conductors 52*a* to 52*g*, 53*a* to 53*g*, 55*a* to 55*g* and 56*a* to 56*g* shown in FIG. 6.

Figure 7:
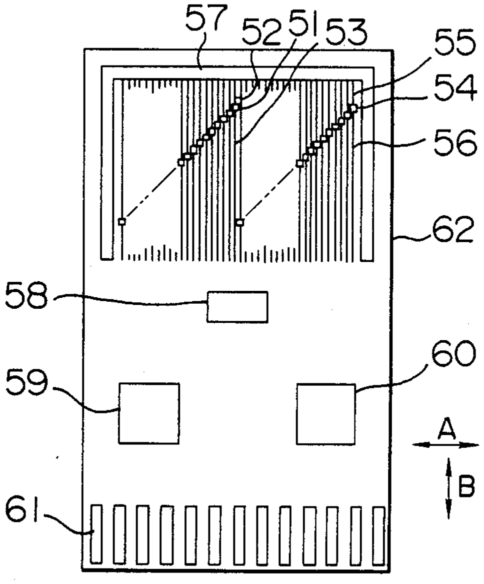
FIG. 7 is a plan view showing a thermal head which is used in the printer of FIG. 3 and has the arrangement of FIG. 6.

FIG. 7 is a plan view showing the whole of the thermal head 5 having the heating elements and wiring conductors shown in FIG. 6. In FIG. 7, reference numeral 51 designates the first heating element group composed of the heating elements 51*a* to 51*g*, 54 the second heating element group composed of the heating elements 54*a* to 54*g*, 52 a wiring conductor group composed of wiring conductors 52*a* to 52*g*, 53 a wiring conductor group composed of wiring conductors 53*a* to 53*g*, 55 a wiring conductor group composed of the wiring conductors 55*a* to 55*g*, 56 a wiring conductor group composed of the wiring conductors 56*a* to 56*g*, 57 a common wiring conductor connected to the wiring conductor groups 52 and 55, 58 a thermistor for detecting the temperature of the thermal head 5, 59 and 60 drive circuits each formed of an integrated circuit, and 61 connector terminals provided on an insulating ceramic substrate 62 for connecting the wiring on the thermal head 7 to the control unit 21 provided in the printer proper.

Figure 8:
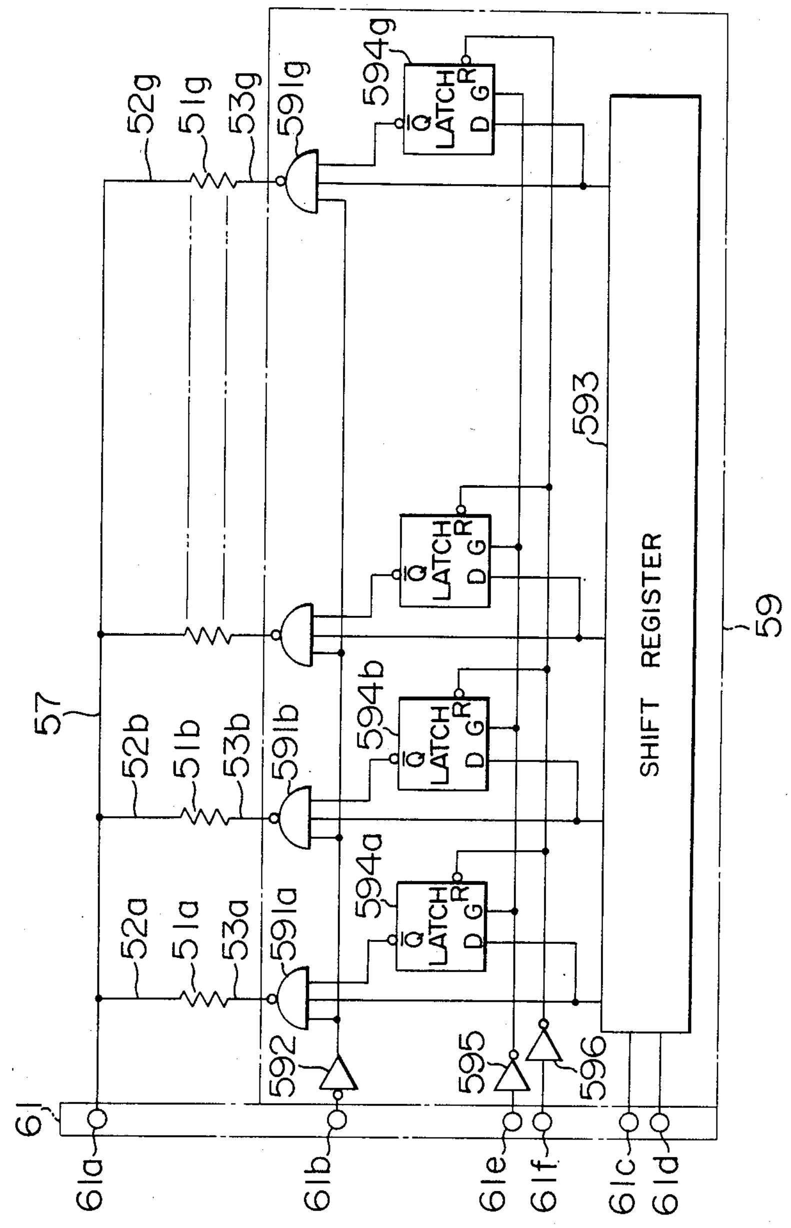
FIG. 8 is a circuit diagram showing the connection of heating elements to a drive circuit in the thermal head of FIG. 7.

FIG. 8 is a circuit diagram showing the connection of the first heating element group 51 to the drive circuit 59. The connection of the second heating element group 54 to the drive circuit 60 can be made in the same manner as shown in FIG. 8, and therefore explanation thereof will be omitted.

Referring to FIG. 8, each of the heating elements 51*a* to 51*g* is expressed by a resistor, and one end of each heating element is connected to the common wiring conductor 57 through a corresponding one of the wiring conductors 52*a* to 52*g*, to be applied with a voltage of +12 V from a terminal 61*a*. The other end of each heating element is connected to the output terminal of one of 3-input NAND gates 591*a* to 591*g* which are included in the drive circuit 59, through one of the wiring conductors 53*a* to 53*g*. First input terminals of the NAND gates 591*a* to 591*g* are connected to each other, and then connected to a terminal 61*b* through an inverter 592, to be applied with a strobe signal. Second input terminals of the NAND gates 591*a* to 591*g* are connected to output terminals of a shift register 593, to be applied with serial data for recording, that is, serial data for causing a current to flow through each heating element. The shift register 593 takes in a recording data signal from a terminal 61*c* bit by bit, in response to a clock signal from a terminal 61*d*. Latch circuits 594*a* to 594*g* latch recording data which are formed of a plurality of bits and delivered from the shift register 593 simultaneously and in parallel, in response to a latch signal, and supplies inverted versions of the recording data (that is, inverted outputs) to third input terminals of the NAND gates 591*a* to 591*g*. The above latch signal is sent from a terminal 61*e* to the latch circuits 594*a* to 594*g* through an inverter 595. The latch circuits 594*a* to 594*g* are reset by a reset signal which is supplied from a terminal 61*f* through an inverter 596, to put the inverted outputs to a high level.

Next, a recording operation will be explained.

When the carriage 11 is moved from left to right by the pulse motor 12, the thermal head 5 is controlled by the traction solenoid 10 so as to press the ink ribbon 6 against the recording paper 8, and the ink ribbon 6 is driven. Further, during the period when the carriage 11 is moved from left to right, the heating element groups 51 and 54 on the thermal head 5 are alternately supplied with a current, to melt solid ink on the ink ribbon 6, and to attach the molten ink to the recording paper 8. A recorded pattern due to the first heating element group 51 is combined with another recorded pattern due to the second heating element group 54, to form a desired character or graph. In more detail, the first heating element group 51 contributes to a recorded pattern which is formed of dots at odd-numbered positions (from the left end) on evennumbered lines (from the top) and at even-numbered positions on odd-numbered lines, and the second heating element group 54 contributes to a recorded pattern which is formed of dots at odd-numbered positions on odd-numbered lines and at even-numbered positions on even-numbered lines.

When the carriage 11 reaches the right end of a recording region, the movement of the carriage 11 is stopped, and a pressure applied to the thermal head for pressing the ink ribbon 6 against the recording paper 8 is removed. In this state, the carriage 11 is returned to the left end. Further, the platen roller 7 is turned, to move the recording paper 8.

The above operation is repeated, till the recording of a desired pattern is completed.

Figure 9:
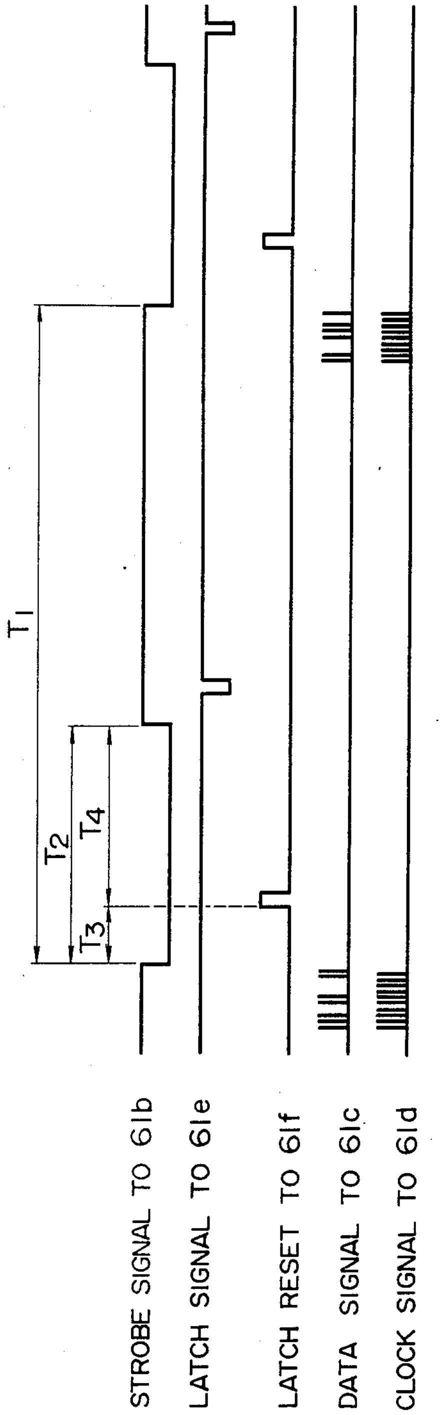
FIG. 9 is a time chart for explaining the recording operation of the printer of FIG. 3.

FIG. 9 is a timing chart of signals which are applied to the drive circuit 59 in the above-mentioned recording operation. Referring to FIG. 9, the strobe signal having a repetition period of $T_1$ is supplied from the terminal 61*b* to the NAND gates 591*a* to 591*g*, to put the first input terminals thereof to a high level for a period of $T_2$, thereby determining a desired current flowing period. Prior to the current flowing period, the recording data signal from the terminal 61*c* is received by the shift register 593 in response to the clock signal, to be sent to the second input terminals of the NAND gates 591*a* to 591*g*. The latch circuits 594*a* to 594*g* latch the preceding recording data, on the basis of the latch signal from the terminal 61*e*, and the inverted versions of the latched data are applied to the third input terminals of the NAND gates 591*a* to 591*g*. Accordingly, when the strobe pulse is generated, NAND gates corresponding to some heating elements which have not been supplied with a current by the preceding recording data, are made conductive, and thus such heating elements are supplied with a current, to be preliminarily heated. This preliminary heating is made for eliminating a difference in temperature between heating elements which have been supplied with a current by the preceding recording data, and heating elements which have not been supplied with a current by the preceding recording data.

When a period $T_3$ has elapsed, the latch reset signal from the terminal 61*f* is applied to the latch circuits 594*a* to 594*g*, and thus the inverted outputs thereof are put to a high level. In a period $T_4$ which follows the period $T_3$, a current is supplied to the heating elements 51*a* to 51*g*, in accordance with new recording data from the shift register 593.

As can be seen from the foregoing explanation, the thermal head 5 according to the present invention can exhibit the following effects in the present printer.

(a) Each of the heating elements has a rectangular shape satisfying a relation $W<H$, and therefore can produce a square dot even in a high-speed recording operation.

(b) The wiring conductors are extended from the heating elements in vertical directions, and therefore each heating element can have a large resistance value, as compared with the case where the wiring conductors are extended from the heating elements along a horizontal direction. Accordingly, a current supplied to each heating element can be reduced, and thus power loss due to the wiring conductors can be made small.

(c) The heating elements are arranged so as to satisfy a relation $H \geqq P$. Accordingly, a continuous vertical line can be printed. Further, a horizontal line having a large width can be printed, and thus the recording desnity can be increased.

(d) The total length of a pair of wiring conductors connected to top and bottom ends of a heating element is equal to the total length of a pair of wiring conductors connected to a given one of the remaining heating elements. Accordingly, a plurality of wiring conductor pairs are equal to each other in power loss. Thus, the heating elements can produce recorded dots having the same tone.

(e) Unlike conventional thermal heads which are required to have a horizontal width equal to the sum of the dimension W and a horizontal dimension for wiring, the thermal head 5 according to the present invention has a horizontal width nearly equal to a horizontal dimension for wiring, and thus a pressure applied to the thermal head 5 for pressing the ink ribbon against the recording paper is relatively low.

We claim:

1. A thermal head having a moving direction in a dot-matrix printer and comprising:

an insulating substrate;

a plurality of heating elements each formed on said insulating substrate and having a heating surface capable of forming a dot on a recording medium when a current flows through the heating element; and wiring means for supplying electric power to said heating elements;

wherein said heating elements are arranged in an oblique line with respect to the moving direction of the thermal head, the dimension of the heating surface of each heating element in a direction parallel to the moving direction of the thermal head being smaller than a distance interval between said heating elements when viewed along the moving direction of the thermal head, and the dimension of the heating surface of each heating element in a direction parallel to the moving direction of the thermal head is smaller than the dimension of said heating surface in a direction perpendicular to the moving direction of the thermal head, and further wherein said distance interval viewed along the moving direction of the thermal head is substantially equal to a distance interval between said heating elements when viewed along a direction perpendicular to the moving direction of the thermal head, and the dimension of the heating surface of each heating element in a direction perpendicular to the moving direction of the thermal head is greater than said interval viewed along said direction perpendicular to the moving direction of the thermal head.

2. A thermal head according to claim 1, wherein said wiring means includes a plurality of wiring conductor pairs which are arranged in parallel with each other along a direction intersecting with the moving direction of the thermal head, with a gap between adjacent wiring conductor pairs, and each of said wiring conductor pairs is connected to both ends of the heating surface of a corresponding heating element which exists in the lenghwise direction of said heating surface.

3. A thermal head according to claim 2, wherein said wiring means further includes a common wiring conductor extended along the moving direction of the thermal head, one wiring conductor of each of said wiring conductor pairs is connected to said common wiring conductor, and the other wiring conductor of each wiring conductor pair is extended to be connected to a dirve circuit.

4. A thermal head according to claim 1, wherein the dimension of the heating surface of each heating element in a direction perpendicular to the moving direction of the thermal head is greater than a distance interval between said heating elements when viewed along a direction perpendicular to the moving direction of the thermal head.

5. A thermal head according to claim 1 wherein said heating elements are arranged in a plurality of oblique lines.

6. A thermal head according to claim 1, further comprising a drive circuit provided on said insulating substrate for selectively supplying said heating elements with a current through said wiring means.

7. A thermal head according to claim 3, further comprising a drive circuit provided on said insulating substrate on that side of said heating elements which is remote from said common wiring conductor, for selectively supplying said heating elements with a current through said wiring means.

* * * * *